(12) United States Patent
Tao

(10) Patent No.: US 9,313,034 B2
(45) Date of Patent: Apr. 12, 2016

(54) METHOD AND SYSTEM FOR POWER-FAIL PROTECTION OF COMMUNICATION EQUIPMENT, AND POWER CONTROLLER

(75) Inventor: Deming Tao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 754 days.

(21) Appl. No.: 13/393,406

(22) PCT Filed: Sep. 2, 2009

(86) PCT No.: PCT/CN2009/073711
§ 371 (c)(1),
(2), (4) Date: Feb. 29, 2012

(87) PCT Pub. No.: WO2011/026270
PCT Pub. Date: Mar. 10, 2011

(65) Prior Publication Data
US 2012/0161515 A1    Jun. 28, 2012

(51) Int. Cl.
*H02J 4/00* (2006.01)
*H04L 12/12* (2006.01)
*H04L 12/26* (2006.01)
(Continued)

(52) U.S. Cl.
CPC *H04L 12/12* (2013.01); *G06F 1/28* (2013.01); *H02J 9/061* (2013.01); *H04L 43/0817* (2013.01); *Y02B 60/34* (2013.01); *Y04S 40/168* (2013.01); *Y10T 307/344* (2015.04)

(58) Field of Classification Search
CPC ..... H04L 12/12; H04L 43/0817; H02J 9/061; G06F 1/28; Y04S 40/168; Y02B 60/34
USPC ...................... 307/23; 372/143, 198; 713/300
See application file for complete search history.

(56) References Cited

U.S. PATENT DOCUMENTS

| 4,817,091 A | * | 3/1989 | Katzman | ............. G06F 12/1458 |
| | | | | 711/E12.093 |
| 4,977,537 A | * | 12/1990 | Dias | ......................... G06F 1/30 |
| | | | | 365/222 |
| 5,319,571 A | * | 6/1994 | Langer | ...................... G06F 1/26 |
| | | | | 713/300 |

(Continued)

FOREIGN PATENT DOCUMENTS

| CN | 1221703 A | 7/1999 |
| CN | 101442215 A | 5/2009 |
| EP | 0385774 | 11/1997 |

*Primary Examiner* — Jared Fureman
*Assistant Examiner* — Elim Ortiz
(74) *Attorney, Agent, or Firm* — McGarry Bair PC

(57) ABSTRACT

The invention discloses a method and a system for power-fail protection of communication equipments, and a power controller. The method is applied to a system comprising a power controller, a power detection unit, and an energy storage conversion unit. The method includes: a power controller acquires the information of one or more circuit boards requiring protection in an equipment; when the power controller determines the equipment is currently in power-fail status, the power controller indicates to gate the switches between an energy storage conversion unit and one or more circuit boards, and provides the pre-stored electric energy to the one or more circuit boards. According to the technical solution provided by the present invention, the problems in the related art that the power consumption is large, the cost is high and it is difficult to implement when the power-fail protection is performed for all circuit boards of a frame are solved, so the power consumption is effectively reduced and the cost is saved.

9 Claims, 6 Drawing Sheets

(51) Int. Cl.
*G06F 1/28* (2006.01)
*H02J 9/06* (2006.01)

(56) References Cited

U.S. PATENT DOCUMENTS

| | | | | |
|---|---|---|---|---|
| 6,492,850 B2* | 12/2002 | Kato | ................ | G05F 1/465 327/143 |
| 6,594,768 B1* | 7/2003 | Ono | ................ | G06F 1/30 710/301 |
| 7,132,822 B1* | 11/2006 | Breitlow | ................ | G06F 1/30 324/142 |
| 7,265,605 B1* | 9/2007 | Vasudevan | ................ | G05F 1/56 327/534 |
| 2008/0184043 A1* | 7/2008 | Tsai | ................ | G06F 1/3287 713/300 |
| 2009/0150702 A1* | 6/2009 | Pickholz | ................ | G06F 1/3203 713/330 |
| 2009/0172469 A1* | 7/2009 | Xiao | ................ | G06F 1/30 714/14 |

\* cited by examiner

METHOD AND SYSTEM FOR POWER-FAIL PROTECTION OF COMMUNICATION EQUIPMENT, AND POWER CONTROLLER

CROSS-REFERENCE TO RELATED APPLICATIONS

This application is a National Phase application of International Application No. PCT/CN2009/073711, filed Sep. 2, 2009, which is incorporated herein by reference in its entirety.

FIELD OF THE INVENTION

The invention relates to the communication field, and in particular to a method and a system for power-fail protection for communication equipments, and a power controller.

BACKGROUND OF THE INVENTION

The application of network equipments is essential to people's daily work and life, so it is particularly important to ensure the safe operation of the network equipments, in particular the safe operation of the core communication equipment in the communication network.

In the operation process of the communication equipments, when the power supply is cut off, it is necessary to perform differential treatment on the circuit boards in the communication equipment for power-fail protection. For example, those circuit boards, which are not important, not high in user level and do not bear services can be unprotected. However, those circuit boards, which are high in importance level, and relates to the core service, should be under the key protection.

During a continuous period of time after the input power supply breaks down and is powered down, the key circuit board in the communication equipment can be ensured to operate continuously for a period of time by using the limited and pre-stored energy. During this period of time, the important user data and management data can be transmitted, stored and processed in time; or the upstream equipment and the downstream equipment connected with the key circuit board are enabled to obtain the status of the circuit board before power failure, so that it can be judged the failure is caused by the interruption of power supply or by equipment failure to maintain and repair the failure conveniently. If the power supply oscillates in the period less than the specified period of time, the circuit board can be transited smoothly, so the uninterrupted operation of the network equipment is ensured.

At present, each circuit board is designed with the power-fail protection function. The consumption cost of the whole machine is very high if the power-fail protection of communication equipments is realized through this solution. For example, the Peripheral Component Interconnection (PCI) industrial computer manufacturer's group (PICMG) formulates the corresponding standards according to the requirements of power-fail protection, wherein the PICMG 3.0 specifies that: the maximum power consumption of the circuit board is 200 watts; and under the condition the power supply input is turned off for 5 milliseconds, the circuit board can operate normally. According to the above solution, the power-fail protection is realized on each circuit board; it is technically feasible, but the priorities are misplaced and the cost is very high, so the performance-price ratio is not high.

If the power-fail protection function of the equipment is designed on the main power supply of a frame, the power-fail protection of all circuit boards is realized by the main power supply. For example, for the equipment having 16 circuit boards generally, the machine frame power consumption is up to 3200 watts. For the high-power communication equipment, the power consumption of which is 3200 W, it is technically very difficult to allow the power supply to be turned off for 5 milliseconds, and the consumption cost is very high.

SUMMARY OF THE INVENTION

Considering the problems in the related art that the power consumption is large, the cost is high and it is difficult to implement when the power-fail protection is performed to all circuit boards of a frame, the invention is proposed. For this purpose, an improved method and an improved system for power-fail protection of communication equipments and a power controller are provided to solve at least one of the above problems.

According to one aspect of the invention, a method for power-fail protection of communication equipments is provided.

The method for power-fail protection of communication equipments according to the invention is applied to a system comprising a power controller, a power detection unit, and an energy storage conversion unit, wherein the method comprises the steps of: acquiring, by the power controller, information of one or more circuit boards requiring protection in an equipment; indicating, by the power controller, when the power controller determines the equipment is currently in power-fail status, to gate the switches between the energy storage conversion unit and the one or more circuit boards, and providing pre-stored electric energy to the one or more circuit boards.

According to another aspect of the invention, a system for power-fail protection of communication equipments is provided.

The system for power-fail protection according to the invention comprises: a power controller, configured to indicate to gate the switches between an energy storage conversion unit and one or more circuit boards, and provide pre-stored electric energy to the one or more circuit boards according to the acquired information of the one or more circuit boards requiring protection in an equipment when the power controller determines that the equipment is currently in the power-fail status; an energy storage gating unit, configured to gate the switches between the energy storage conversion unit and the one or more circuit boards according to a gate control signal sent by the power controller; the energy storage conversion unit, configured to store the electric energy in a manner of generating independent energy storage voltage.

According to another aspect of the invention, a power controller is provided.

The power controller according to the invention comprises: an acquiring unit, configured to acquire information of one or more circuit boards requiring protection in an equipment; a control unit, configured to indicate to gate the switches between an energy storage conversion unit and the one or more circuit boards, and provide the pre-stored electric energy to the one or more circuit boards when the equipment is determined to be currently in a power-fail status.

According to the invention, the information of one or more circuit boards requiring protection in the equipment is acquired; and when the equipment is determined to be currently in power-fail status, the switches between the energy storage conversion unit and the one or more circuit boards are gated, and the pre-stored electric energy is provided to the one or more circuit boards. The problems in the related art that the power consumption is large, the cost is high and it is difficult to implement when the power-fail protection for all circuit boards of the frame is performed are solved, so that the power is effectively reduced and the cost is saved.

Other characteristics and advantages of the invention will be described in the subsequent description, and partly become obvious from the description, or be understood through implementing the invention. The objects and other advantages of the invention can be realized and obtained through the structures especially pointed out in the description, claims and drawings.

BRIEF DESCRIPTION OF THE DRAWINGS

The drawings described here are used for providing the further understanding of the invention, and constitute a part of the application. The exemplary embodiments of the invention and the description thereof are used to explain the invention without unduly limiting the scope of the present invention. In the drawings.

DETAILED DESCRIPTION OF THE INVENTION

Function Overview

Considering the problems in the related art that the power consumption is large, the cost is high and it is difficult to implement when the power-fail protection for all circuit boards of a frame is performed, a power-fail protection solution for the communication equipments is provided by the embodiments of the invention. When the power supply of the equipment is oscillated and interrupted, the energy storage circuit on a power of the frame is controlled to switch to the preset one or more circuit boards by the power controller, so that the power supply of one or more key circuit boards in the communication equipment can be ensured preferentially, and the timely transmission, storage and processing of the key user data and management data can be realized.

It should be noted that, under the non-conflict condition, the embodiments in the application and the features in the embodiments can be combined with each other. The invention is described below with reference to the drawings and the embodiments in detail.

Method Embodiment

According to the embodiment of the invention, a method for power-fail protection of communication equipments is provided firstly.

Figure 1:
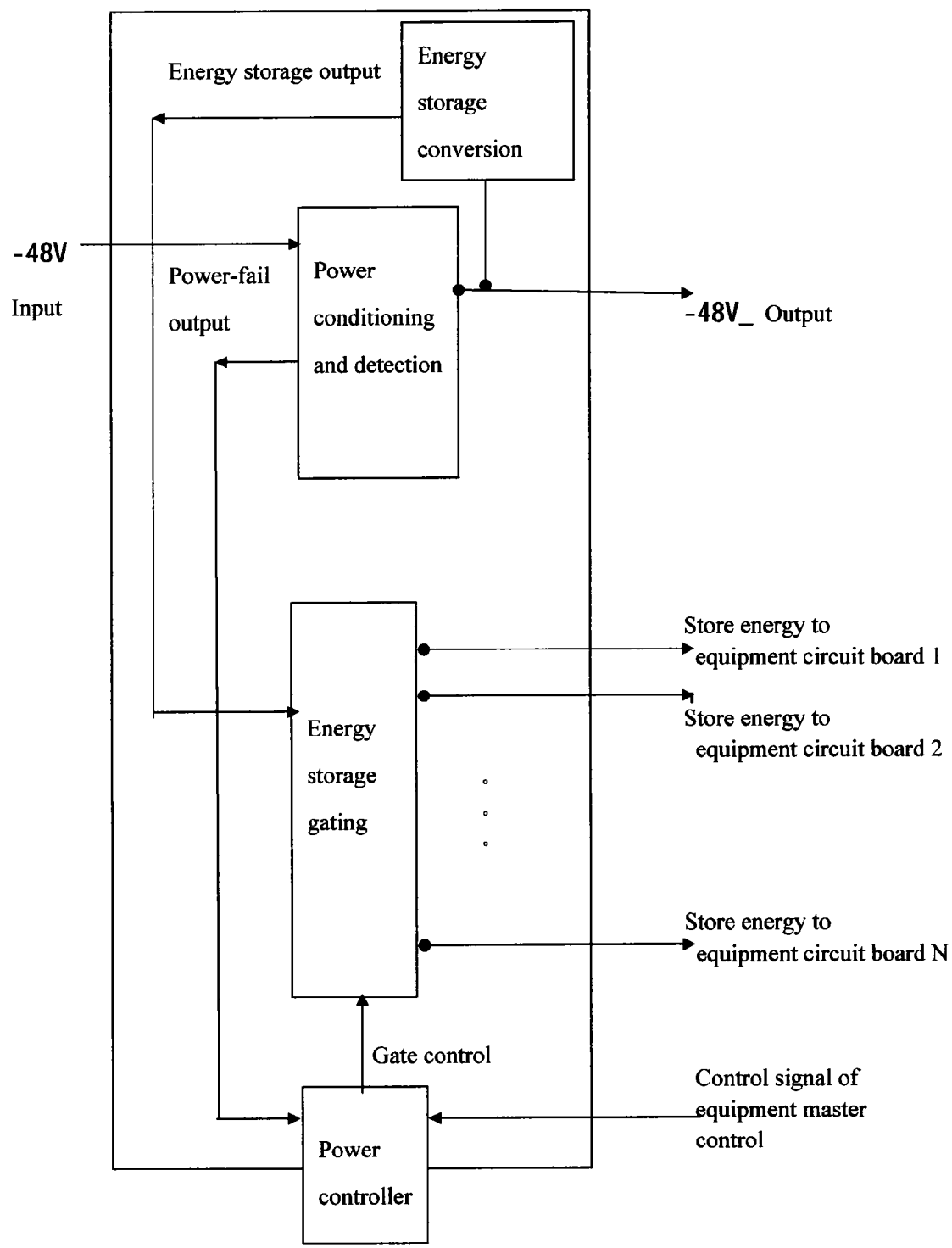
FIG. 1 shows a structural schematic diagram of a system for power-fail protection of communication equipments according to an embodiment of the invention.

In order to clearly introduce the solution, the solution is firstly described with reference to FIG. 1 in detail. FIG. 1 shows a structural schematic diagram of a system for power-fail protection of communication equipments according to an embodiment of the invention. As shown in FIG. 1, the system for power-fail protection of the communication equipments according to the embodiment of the invention mainly comprises the following parts: a power controller, a power conditioning and detection unit, an energy storage conversion unit and an energy storage gating unit, wherein the main functions of the power controller comprise: receiving an instruction of master controller of the equipment, acquiring a power-fail signal of the power supply, and sending a gate control signal to the energy storage gating unit when the power supply is powered down. The power conditioning and detection unit is connected with the power controller, and the main functions of the power conditioning and detection unit comprise: performing the processing, such as filtering, protecting and the like on the input power supply, and detecting the status of the power supply simultaneously, for example, whether the power supply is in power-fail status and the like. The main functions of the energy storage conversion unit comprises: generating the independent energy storage voltage for storing electric energy. During the normal operation, the electric energy is stored by the energy storage voltage; when the power supply is turned off or oscillates, the stored electric energy is provided for the specified circuit board via the gate circuit so as to realize the energy required by power-fail protection. The energy storage gating unit is connected with the energy storage conversion unit, and the main functions of the energy storage gating unit comprise: receiving a gate signal of the power controller, and providing the stored electric energy to the specified circuit boards (namely the circuit boards requiring protection).

In the specific implementation process, under the normal operation status, the 48V power supply (herein the 48V power supply is taken as an example) directly supplies power to all the circuit boards in the equipment (Equipment Circuit board 1, . . . Equipment Circuit board N are shown in the figure) after being conditioned and detected; and meanwhile the detected equipment power status signal is sent to the power controller. After the power controller is electrified, it receives the instruction of the master controller, obtains the slot position number of the protected circuit board, and judges whether the equipment power supply status is normal; if normal, the energy storage conversion circuit, as shown in FIG. 1, generates the energy storage voltage for storing the electric energy for power-fail protection. At this moment, all the circuit boards of the equipment are powered by the 48V power supply.

When the 48V power supply is powered down or oscillates, and when the voltage at the input terminal is detected to fall to the preset threshold by the detection circuit, an equipment power-fail signal is sent to the power controller. As shown in FIG. 1, the power controller receives the equipment power-fail signal, and acquires the slot position number of the circuit board requiring protection according to the control signal of equipment master control sent by the equipment master controller. The power controller closes the energy storage gating circuit of the slot position needed to be protected according to the gate control signal, and provides the reserved power supply to the circuit board corresponding to the slot position needed to be protected, so the power-fail protection of the corresponding circuit board is realized.

Figure 2:
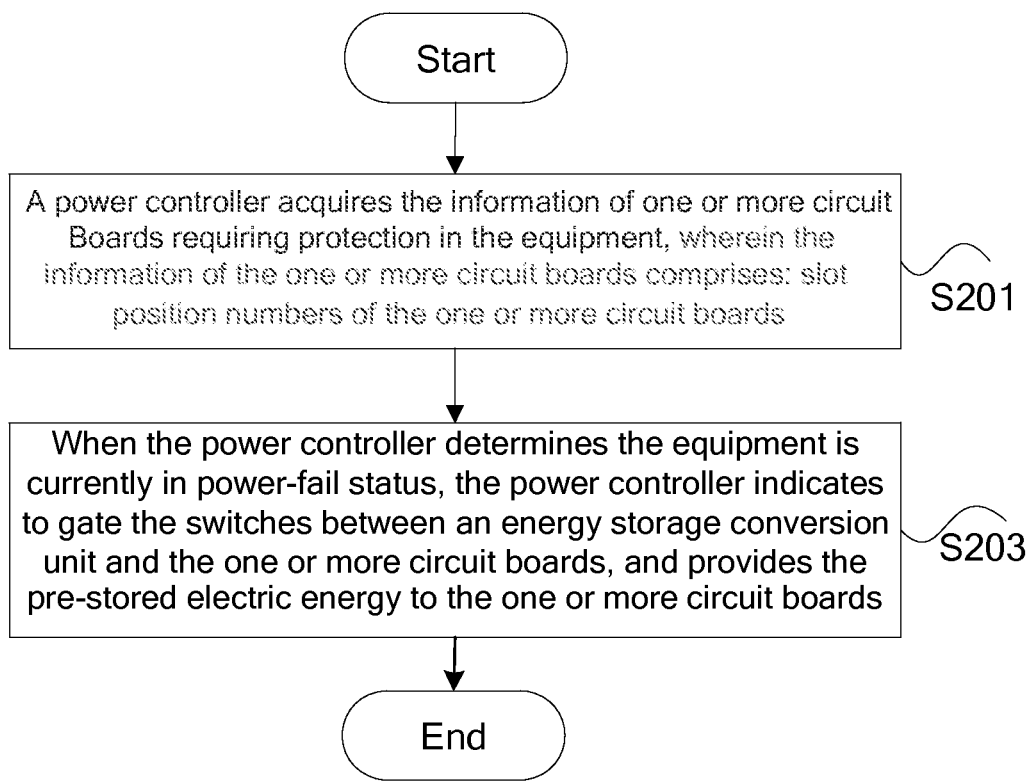
FIG. 2 shows a flowchart of a method for power-fail protection of communication equipments according to an embodiment of the invention.

FIG. 2 shows a flowchart of a method for power-fail protection of communication equipment according to an embodiment of the invention. As shown in FIG. 2, the method for power-fail protection of communication equipments according to the embodiment of the invention comprises following processing (Step S201-Step S203).

Step S201: a power controller acquires the information of one or more circuit boards requiring protection in the equipment.

In this case, the information of one or more circuit boards comprises but is not limited to: the slot position numbers of the one or more circuit boards.

Preferably, the power controller acquires the information of the one or more circuit boards requiring protection in the equipment in the following manner: the power controller receives the master control instruction from the master controller, wherein the master control instruction carries the information pre-configured in the master controller.

Specifically, in the master controller, the slot position number of the circuit board requiring protection can be pre-stored in the master controller according to the demands of the users.

Step S203: when the power controller determines the equipment is currently in power-fail status, the power controller indicates to gate the switches between an energy storage conversion unit and the one or more circuit boards, and provides the pre-stored electric energy to the one or more circuit boards.

Preferably, the power controller determines the equipment is currently in power-fail status in the following manner: the power controller receives a power status signal from a power detection unit, wherein the power status signal indicates that the equipment is currently in power-fail status.

In this case, the step of receiving, by the power controller, the power status signal from the power detection unit comprises the following processing:

(1) the power controller receives the power status signal from the power detection unit, wherein the power status signal carries the information, which is detected by power detection circuit, of the current input voltage being lower than a preset threshold;

(2) the power controller determines the equipment is currently in power-fail status according to the power status signal.

Preferably, an energy storage conversion unit stores the electric energy in a manner of generating independent energy storage voltage.

Preferably, the step of indicating, by the power controller, to gate the switches between the energy storage conversion unit and the one or more circuit boards comprises following processing: the power controller sends a gate control signal to the energy storage gating unit, wherein the gate control signal indicates the energy storage gating unit to turn on the switches between the energy storage conversion unit and the one or more circuit boards.

Figure 3:
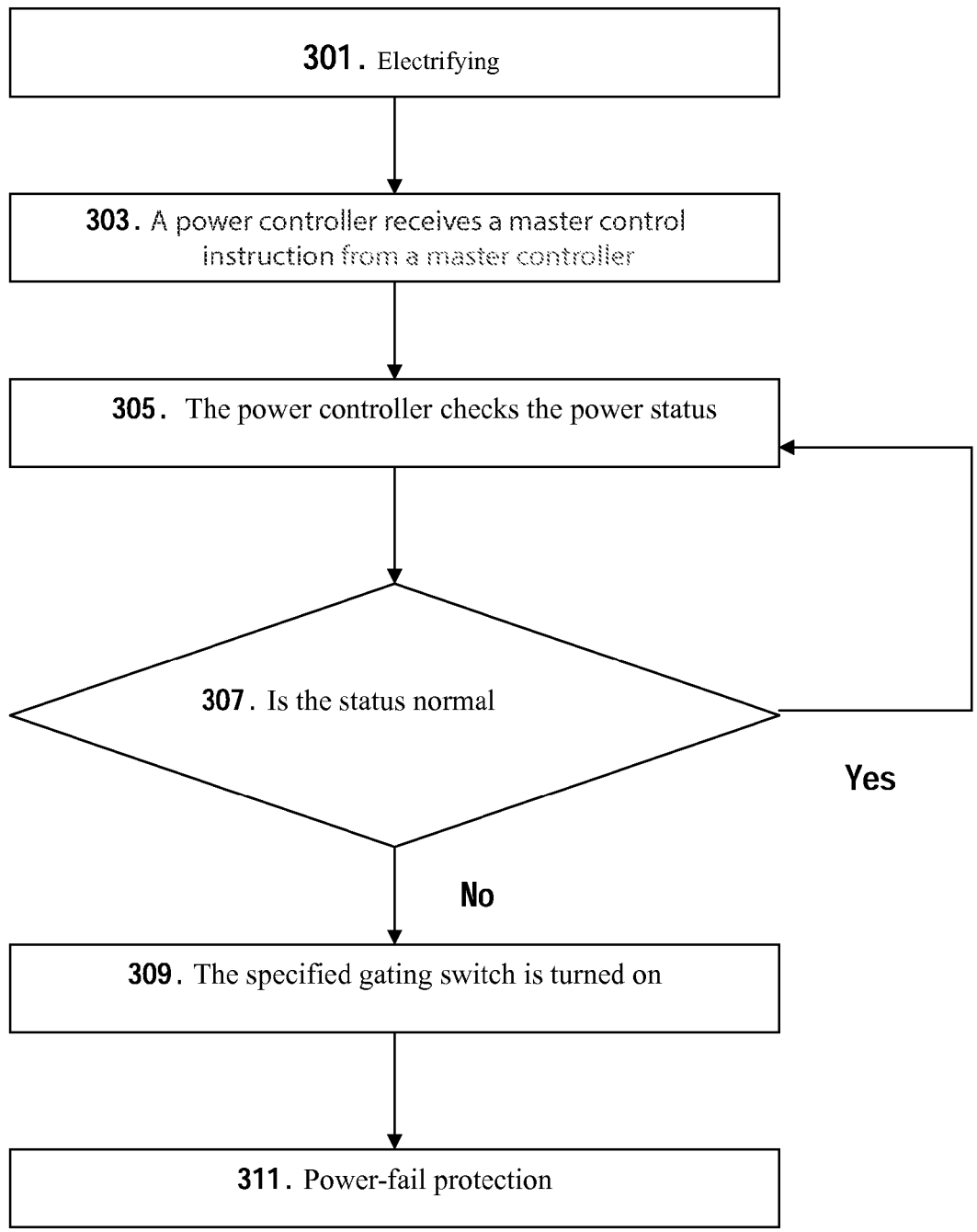
FIG. 3 shows a flowchart of a method for power-fail protection of communication equipments according to a preferred embodiment of the invention.

FIG. 3 shows a flowchart of a method for power-fail protection of communication equipments according to a preferred embodiment of the invention. As shown in FIG. 3, the method for power-fail protection of communication equipments according to the preferred embodiment of the invention comprises the following processing (Step S301-Step S311).

Step S301: electrifying, mainly finishing supplying power to all the circuit boards by the input 48V, equipment initialization, detecting power status by a detection unit (circuit), energy storage conversion and the like.

Step S303: a power controller receives a master control instruction, and the main process comprises that an equipment master controller sends the configured protection information to the power controller.

Step S305: the power controller checks the power status, and the main process comprises that the power controller receives a power status signal from a power detection circuit.

Step S307: the power controller judges whether the power status is normal, and if the status is normal, keeps on detecting; and if power-fail phenomenon is found, sends a gate control signal to gating switches.

Step S309: an energy storage gating unit turns on the corresponding switches according to the gate control signal sent by the power controller. For example, the gating signal indicates to turn on the switch between an energy storage conversion unit and Circuit board 2, then the switch is turned on and the energy stored by the energy storage conversion unit is provided to the Circuit board 2, wherein the Circuit board 2 is the preset key circuit board requiring protection.

Step S311: power-fail protection, namely, provides the electric energy received by the gating switch to the specified circuit board, to ensure the normal operation of the circuit board within a certain period of time.

Preferably, the duration of the power-fail protection time T is directly proportional to the capacity of the energy storage device in the energy storage circuit, and the duration of the power-fail protection time T is inversely proportional to the total circuit board power consumption $P_{out}$. The capacity of the energy storage device can be conditioned and maintained according to the number of circuit boards requiring protection, power consumption magnitude and power-fail protection time.

Through the above embodiments, a method for power-fail protection of communication equipments is provided. Under the condition the frame is powered down, the pre-stored energy can be provided to the specified circuit board in time. Since the power-fail protection is not realized for each circuit board, the power consumption of the power supply can be reduced, the cost can be lowered, and it is easy to implement.

System Embodiment

According to the embodiment of the invention, a system for power-fail protection of communication equipments is also provided.

Figure 4:
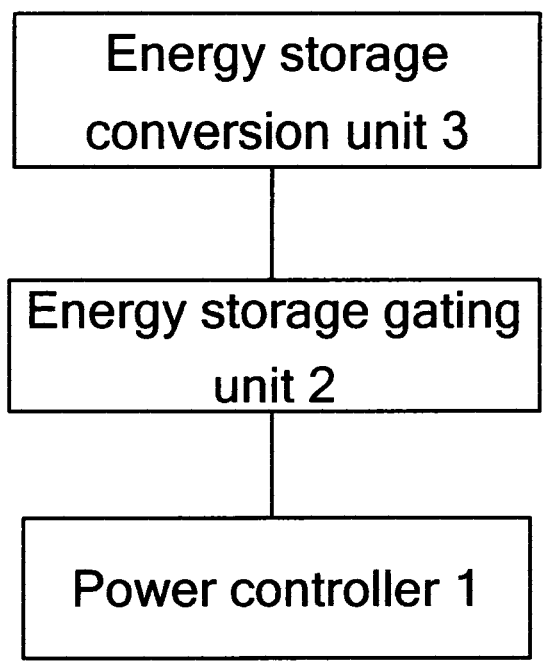
FIG. 4 shows a structural block diagram of a system for power-fail protection of communication equipments according to an embodiment of the invention.
Figure 5:
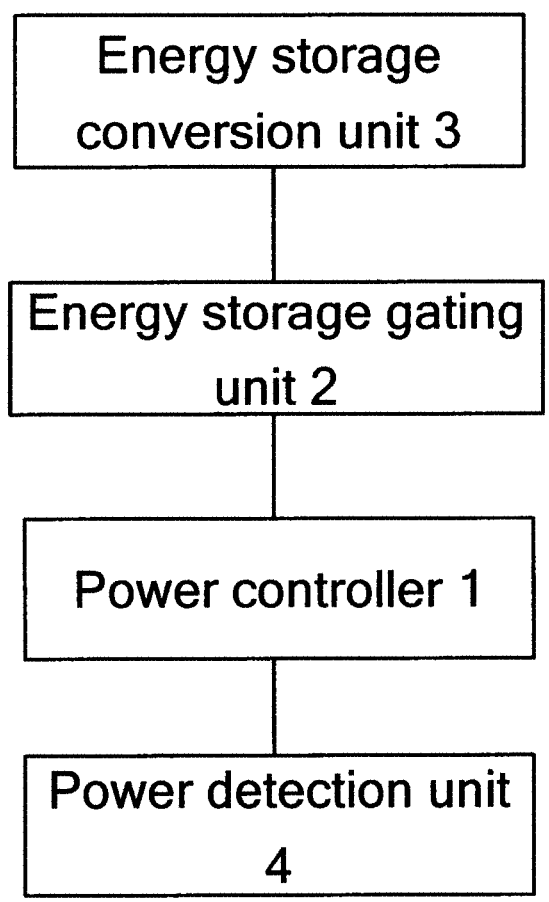
FIG. 5 shows a structural block diagram of a system for power-fail protection of communication equipments according to a preferred embodiment of the invention.

FIG. 4 shows a structural block diagram of a system for power-fail protection of communication equipments according to an embodiment of the invention. FIG. 5 shows a structural block diagram of a system for power-fail protection of communication equipments according to a preferred embodiment of the invention. As shown in FIG. 4, the system for power-fail protection of communication equipments according to the embodiment in the invention comprises: a power controller 1, an energy storage gating unit 2 and an energy storage conversion unit 3.

The power controller 1 is configured to indicate to gate the switches between an energy storage conversion unit and one or more circuit boards, and provide the pre-stored electric energy to the one or more circuit boards according to the acquired information of the one or more circuit boards requiring protection in an equipment when the power controller determines that the equipment is currently in the power-fail status.

The energy storage gating unit 2 is connected with the power controller 1 and configured to gate the switches between the energy storage conversion unit and the one or more circuit boards according to a gate control signal sent by the power controller.

The energy storage conversion unit 3 is connected with the energy storage gating unit 2 and configured to store the electric energy in a manner of generating independent energy storage voltage.

Preferably, as shown in FIG. 5, the system may further comprises: a power detection unit 4 (equivalent to the power conditioning and detection unit described in FIG. 1), which is configured to detect whether the voltage at the input end of the equipment is lower than a preset threshold, and send a power status signal to the power controller.

Device Embodiment

According to the embodiment in the invention, a power controller is further provided.

Figure 6:
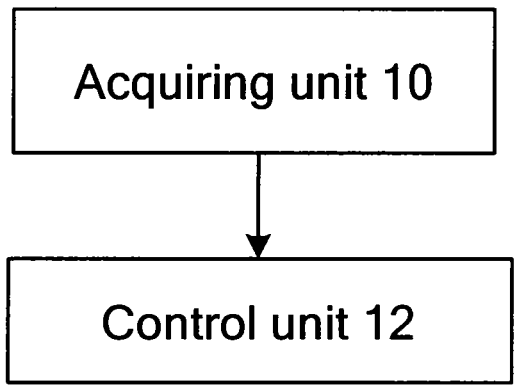
FIG. 6 shows a structural block diagram of a power controller according to an embodiment of the invention.
Figure 7:
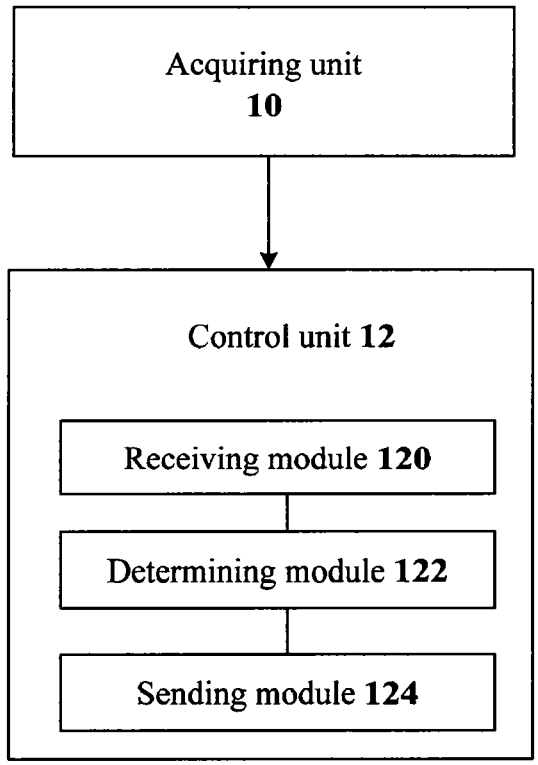
FIG. 7 shows a structural block diagram of a power controller according to a preferred embodiment of the invention.

FIG. 6 shows a structural block diagram of the power controller according to an embodiment of the invention. FIG. 7 shows a structural block diagram of the power controller according to a preferred embodiment of the invention. As shown in FIG. 6, the power controller according to the embodiment of the invention comprises: an acquiring unit 10 and a control unit 12, wherein the acquiring unit 10 is configured to acquire information of one or more circuit boards requiring protection in an equipment; the control unit 12 is connected with the acquiring unit 10 and configured to indicate to gate the switches between an energy storage conversion unit and one or more circuit boards, and provide the pre-stored electric energy to the one or more circuit boards when the equipment is determined to be currently in the power-fail status.

Preferably, as shown in FIG. 7, the control unit 12 may further comprises: a receiving module 120, a determining module 122 and a sending module 124, wherein the receiving module 120 is configured to receive the power status signal from a power detection unit; the determining module 122 is configured to determine the equipment is currently in power-fail status according to the power status signal; and the sending module 124 is configured to send a gate control signal to an energy storage gating unit, wherein the gate control signal indicates the energy storage gating unit to turn on the switches between the energy storage conversion unit and the one or more circuit boards.

According to the above embodiments, a system for power-fail protection of communication equipments and a power controller are provided. Through the mutual combination of the power controller, the energy storage gating unit and the energy storage conversion unit in the system, the power-fail protection can be provided to the specified circuit board, the power consumption is reduced, and it is easy to implement.

As stated above, according to the power-fail protection solution of communication equipments provided by the above embodiments of the invention, the slot position number of the circuit board requiring protection is preset according to the demands of the users, and the pre-stored electric energy is provided to the specified circuit board when the equipment is powered down. Compared with the realization of power-fail protection on each circuit board in the related art, the power consumption is reduced, and the implementation cost is lower. Because the circuit board requiring protection can be changed at any time according to the demands of the users, more flexibility is provided. In addition, the power-fail protection for a certain period of time can be realized so as to protect the transmission, storage and processing of the key user data and management data; if the protocol supports, the upstream equipment and the downstream equipment connected with the key circuit board are enabled to obtain the status of the key circuit board before power-off to realize remote power-fail indication and thereby judge that the failure is caused by the interruption of power supply or by the failure of the equipment itself, thereby facilitating the maintenance and repair for the failure; and if the power supply oscillates for a shorter period of time, the circuit board can be smoothly transited, so the uninterrupted operation of the network equipments is ensured.

Obviously, those skilled in the art should understand that the above-mentioned modules and steps of the invention can be implemented by the general-purpose calculating device; can be concentrated in a single calculating device, or distributed on the network comprised of a plurality of calculating devices. Alternatively, the modules and the steps of the present invention can be implemented by using the executable program code of the calculating device. Consequently, they can be stored in the storing device to be executed by the calculating device, or they can be manufactured into respective integrated circuit module respectively, or a plurality of modules or steps of them can be manufactured into single integrated circuit module to implement. In this way, the invention is not limited to the combination of any specific hardware and software.

The descriptions above are only the preferred embodiments in the invention and not used to limit the invention. For those skilled in the art, the present invention may have various alternations and changes. Any modifications, equivalent replacements, improvements and the like within the spirit and principle of the invention should be included in the scope of protection of the invention.

What is claimed is:

1. A method for power-fail protection of communication equipment when power to the communication equipment is interrupted or oscillates, which is applied to a system comprising a power controller, a power detection unit, and an energy storage conversion unit configured to store electric power for later generating independent energy storage voltage, and the method comprising:
   acquiring, by the power controller, information of at least one of a plurality of circuit boards in the communication equipment requiring protection;
   indicating, by the power controller, when the power controller determines the communication equipment is currently in power-fail status, to gate switches between the energy storage conversion unit and the plurality of circuit boards, and providing independent energy storage voltage to the at least one circuit board;
   wherein determining, by the power controller, the communication equipment is currently in power-fail status in the following manner: receiving, by the power controller, a power status signal from the power detection unit, wherein the power status signal indicates that the communication equipment is currently in power-fail status;
   wherein the step of receiving, by the power controller, the power status signal from the power detection unit comprises: receiving, by the power controller, the power status signal from the power detection unit, wherein the power status signal carries the information, which is detected by the power detection unit, of current input voltage being lower than a preset threshold when the power to the communication equipment is interrupted or oscillates; determining, by the power controller, the communication equipment is currently in power-fail status according to the power status signal.

2. The method according to claim 1, wherein the information comprises:
   slot position numbers of the plurality of circuit boards.

3. The method according to claim 1, wherein acquiring, by the power controller, the information comprises:

receiving, by the power controller, a master control instruction from a master controller, wherein the master control instruction carries the information pre-configured in the master controller.

4. The method according to claim 1, wherein the step of indicating, by the power controller, comprises:

sending, by the power controller, a gate control signal to an energy storage gating unit, wherein the gate control signal indicates the energy storage gating unit to turn on the switches between the energy storage conversion unit and the at least one circuit board.

5. A system for power-fail protection of communication equipment when power to the communication equipment is interrupted or oscillates, the system comprising:

a circuit to carry electric power from a power supply to communication equipment including a plurality of circuit boards;

an energy storage conversion unit connected to the circuit, and configured to store electric power from the power supply for later generating independent energy storage voltage;

an energy storage gating unit connected to the energy storage conversion unit, to a power controller, and to the plurality of circuit boards, and including switches between the energy storage conversion unit and the plurality of circuit boards;

a power controller, configured to acquire information about at least one circuit board of a plurality of circuit boards that requires protection in the communication equipment, and signal the energy storage gating unit to indicate to gate switches and provide independent energy storage voltage to the at least one circuit board that requires protection when the power controller determines that the communication equipment is currently in the power-fail status; and a power detection unit, configured to detect whether the voltage at the input end of the communication equipment is lower than a preset threshold and send a power status signal to the power controller.

6. The system according to claim 5, wherein the power controller comprises:

an acquiring unit, configured to acquire information of one or more circuit boards requiring protection in an communication equipment;

a control unit, configured to indicate to gate the switches between an energy storage conversion unit and the one or more circuit boards, and provide the pre-stored electric energy to the one or more circuit boards when the communication equipment is determined to be currently in a power-fail status.

7. The power controller according to claim 6, wherein the control unit comprises:

a receiving module, configured to receive a power status signal from a power detection unit;

a determining module, configured to determine the communication equipment is currently in the power-fail status according to the power status signal;

a sending module, configured to send a gate control signal to an energy storage gating unit, wherein the gate control signal indicates the energy storage gating unit to turn on the switches between the energy storage conversion unit and the one or more circuit boards.

8. The method according to claim 2, wherein acquiring, by the power controller, the information comprises: receiving, by the power controller, a master control instruction from a master controller, wherein the master control instruction carries the information pre-configured in the master controller.

9. The method according to claim 2, wherein the step of indicating, by the power controller, comprises:

sending, by the power controller, a gate control signal to an energy storage gating unit, wherein the gate control signal indicates the energy storage gating unit to turn on the switches between the energy storage conversion unit and the at least one circuit board.

* * * * *